United States Patent
Carlson et al.

(10) Patent No.: US 6,191,732 B1
(45) Date of Patent: Feb. 20, 2001

(54) REAL-TIME SURVEYING/EARTH MOVING SYSTEM

(75) Inventors: R. Bruce Carlson, Maysville, KY (US); David S. Carlson, Cambridge; Leonid Entov, Arlington, both of MA (US)

(73) Assignee: Carlson Software, Maysville, KY (US)

( * ) Notice: Under 35 U.S.C. 154(b), the term of this patent shall be extended for 0 days.

(21) Appl. No.: 09/318,079

(22) Filed: May 25, 1999

(51) Int. Cl.$^7$ ...................................................... H04B 7/185
(52) U.S. Cl. ................ 342/357.06; 342/357.17; 342/451; 701/213
(58) Field of Search ................... 342/357.06, 357.17, 342/357.01, 451, 457; 701/203, 207

(56) References Cited

U.S. PATENT DOCUMENTS

| | | |
|---|---|---|
| 4,807,131 | 2/1989 | Clegg . |
| 5,375,663 | 12/1994 | Teach . |
| 5,512,905 | 4/1996 | Nichols et al. . |
| 5,631,658 | 5/1997 | Gudat et al. . |
| 5,904,210 | * 5/1999 | Stump et al. ................. 175/45 |

OTHER PUBLICATIONS

*Gradestar Manual*, Version 1.42, Published by Carlson Software, Inc., pp. 1–15, Mar. 10, 1998.
*Stakeless Grade Control, Product Manual*, Published by Trimble Navigation Limited, pp. 1–6, 1999.

* cited by examiner

*Primary Examiner*—Thomas H. Tarcza
*Assistant Examiner*—Dao C. Phan
(74) *Attorney, Agent, or Firm*—Sampson & Associates, P.C.

(57) ABSTRACT

The present invention includes a method and apparatus which determines the tree-dimensional (x, y, z coordinate) position of the receiving position of a GPS antenna on an earth-moving machine or a vehicle, determines the tilt of the machine or vehicle in real time (tilt may vary from point to point), and utilizes this data to calculate the three-dimesional (x, y, z coordinate) position of a point of the earth's surface disposed beneath the machine or vehicle. In a preferred embodiment, the present invention derives and displays the distance between the actual elevation of this point and the desired surface elevation.

33 Claims, 8 Drawing Sheets

REAL-TIME SURVEYING/EARTH MOVING SYSTEM

BACKGROUND OF THE INVENTION

1. Field of the Invention

The invention relates to surveying and/or altering the topography of a worksite, and more particularly, to an apparatus and method for creating, updating and displaying a surface model of the worksite in real-time.

2. Background Information

Throughout this application, various publications, patents and published patent applications are referred to by an identifying citation. The disclosures of the publications, patents and published patent applications referenced in this application are hereby incorporated by reference into the present disclosure.

Relatively sophisticated and powerful geography altering or earth-moving machinery have been developed to recontour the topography of large plots of land, or to otherwise alter the geography of a worksite such as a construction area, mine, road and the like. Such operations often involve the necessity of a survey to obtain the coordinates of a large number of points over the worksite and to thereafter construct a three-dimensional model of the site. From the survey an architectural plan or target geography is developed. Thereafter, survey stakes are placed on the site marked with information or colored to provide physical cues to the operator of the geography altering machinery as to how the machine should be operated to transform the worksite from the original to the desired state. Often, the survey operations are carried out manually, using line of sight optical instruments or other static, point-by-point measuring techniques to obtain the coordinates of the worksite. In this event, a relatively great deal of skill and experience on the part of the operator of the earth moving equipment is required to recontour a large landsite, due in part to the absence of large scale as well as detailed information of the progress being made during the revision of the site.

As a result, most projects involving alteration of the geography of large worksites are generally time consuming and labor intensive due to the requirements for skilled personnel and large crews to direct the operation of earth moving machinery and the like.

In addition, the operation is often interrupted while a survey crew verifies the amount of progress to date and manually updates the staking and marking of the site, as well as the site model.

In efforts to improve the efficiency of such earth moving operations, several methods and systems utilizing satellite-based navigational systems such as the United States Global Positioning System (GPS) or the Russian Global Orbiting Navigation Satellite System (GLONASS), have been devised.

For example, U.S. Pat. No. 4,807,131 to Clegg discloses the concept of utilizing GPS to determine the position of an earth-engaging blade of earth moving equipment. The slope or angle of the blade is then determined, followed by inputting the desired soil topography into a computer. This data is then utilized to adjust the position and slope of the blade to achieve the desired soil topography.

U.S. Pat. No. 5,375,663 to Teach discloses an earth moving apparatus and method for grading a tract of land. This concept includes determination of blade elevation (z-coordinate), such as with a laser system. The distance between the blade and the soil elevation is determined with suitable sensors, such as with an ultrasonic device or system. This data, along with horizontal (x and y) coordinates obtained from GPS or other systems, and with data regarding desired soil topography, are combined to determine the distance between actual and desired soil elevation.

U.S. Pat. No. 5,631,658 to Gudat et al. discloses a similar concept for operating geography-altering machinery relative to a worksite. This concept generally includes determining the three dimensional (x, y, z coordinate) position of a portion of the machinery, such as by utilizing GPS. The position of the equipment is recorded as the equipment is operated, and utilized to determine a path of the machine in real time. This path is then compared to the desired soil topography using a computer to derive the distance between the actual soil topography and the desired soil topography in real time.

The above-referenced concepts have various drawbacks which generally limit their usefulness in various applications. For example, Clegg and Teach each determine blade position and utilize additional sensors to determine the distance between the blade and the soil. This approach ends to be relatively complex. Such complexity may adversely affect system reliability and/or accuracy.

The Gudat reference also disadvantageously discloses a relatively complicated system for generating the path of the earth moving machinery in real time, by interpolating between position data points, ostensibly to improve the accuracy of its soil topography calculations. Such complexity, however, disadvantageously tends to increase the processing time required to run the software, to slow system operation and/or necessitate the use of relatively sophisticated and expensive computer hardware and/or software.

Moreover, none of the above-referenced patents appear to have recognized or addressed the problem of inaccuracies introduced due to tilting of the earth moving apparatus during operation.

For example, an important problem associated with prior art systems is that the height of the GPS antenna on a bulldozer or inspection vehicle may be 16 feet or more above the earth surface and, when the vehicle is tilted to a significant degree such as on a 20° slope, the position calculated using the GPS signal may be in error by about 1 foot (0.3 m) or more in height and about 5.5 feet (1.7 m) in the horizontal plane. This tends to negate the accuracy advantage of utilizing the GPS system which can typically determine the three-dimensional location of the signal-receiving portion of the GPS antenna to within 3 centimeters. With tilt in any direction, the actual distance in the vertical (z-direction) from the GPS signal-receiving antenna portion to the point on the earth's surface will be less than the specified non-tilted distance, and thus the actual elevation of the ground point will be higher than the z-coordinate calculated using the GPS signal. Also, as mentioned above, the actual x and/or y coordinates (position in the horizontal plane) of the point will be different from the x and/or y coordinates determined directly from the GPS signal, adding further inaccuracies to the calculated position.

Thus, a need exists for an improved method and apparatus for operating geography-altering machinery which operates in a relatively simplified manner, while providing improved accuracy by tilt correction.

SUMMARY OF THE INVENTION

According to an embodiment of this invention, a method for determining in real time the three-dimensional position of a point on an earth surface, include the steps of:

(a) providing a vehicle adapted for ground engaging movement along the earth surface, the vehicle having:
   a GPS receiver system with a GPS signal-receiving antenna portion disposed thereon at a spaced location relative to a ground engaging point of the vehicle;
   one or more tilt sensors adapted to measure tilt of the vehicle relative to a horizontal plane along at least one axis; and
   a computer;
(b) receiving a GPS signal at the GPS signal-receiving antenna portion;
(c) utilizing the GPS signal to calculate the three-dimensional location of the signal-receiving antenna portion;
(d) determining the direction of movement of the vehicle;
(e) utilizing the one or more tilt sensors to provide an angle of tilt of the vehicle along at least one axis;
(f) utilizing the three-dimensional location, the spaced location, the angle of tilt, and the direction of movement of the vehicle to calculate in real time the three-dimensional position of a point on the earth surface disposed at a predetermined location relative to the ground engaging point of the vehicle, as the vehicle traverses the surface.

The above and other features and advantages of this invention will be more readily apparent from a reading of the following detailed description of various aspects of the invention taken in conjunction with the accompanying drawings.

DETAILED DESCRIPTION OF THE PREFERRED EMBODIMENTS

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Figure 2:
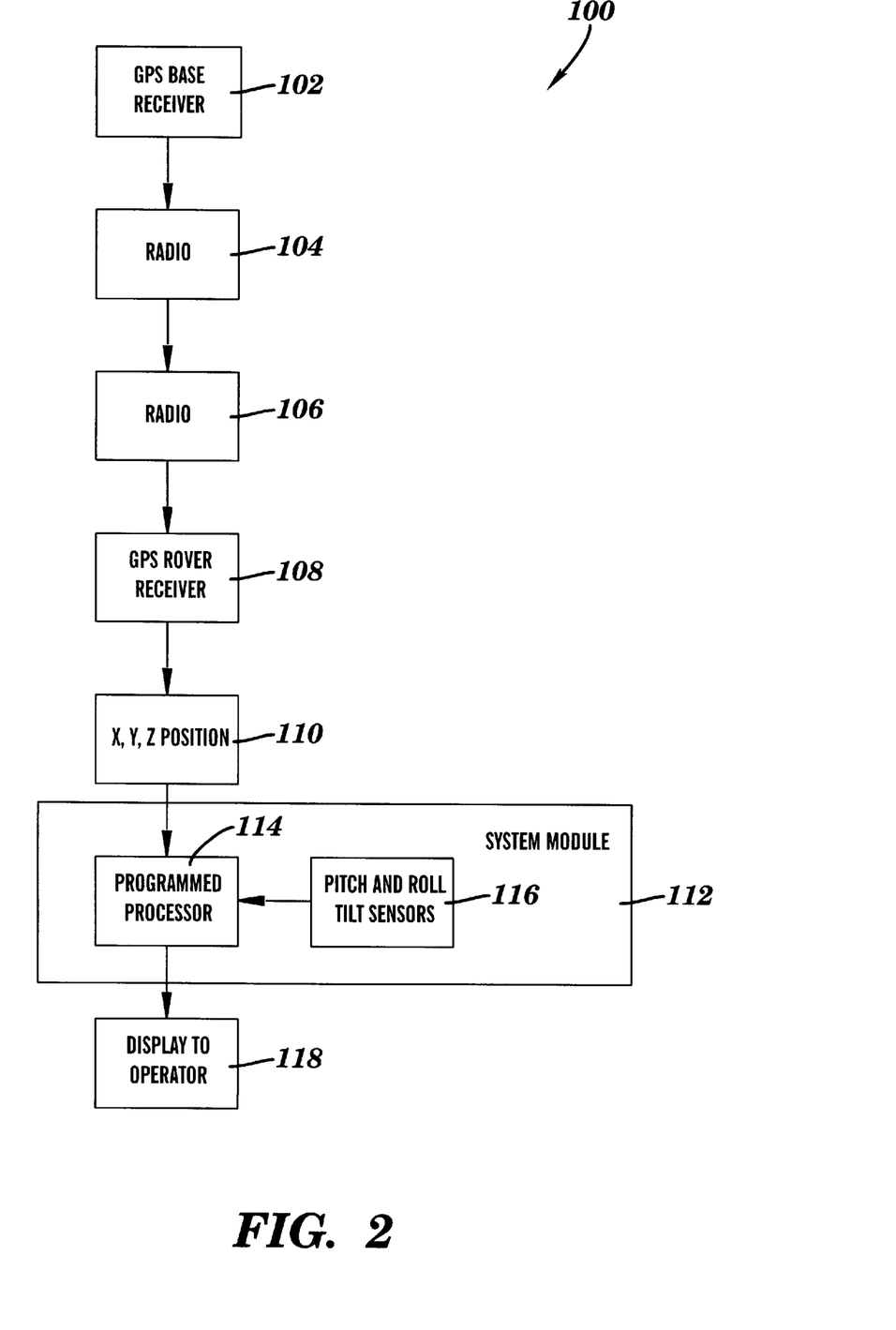
FIG. 2 is a block diagram of a machinery position and control system of the present invention.
Figure 3:
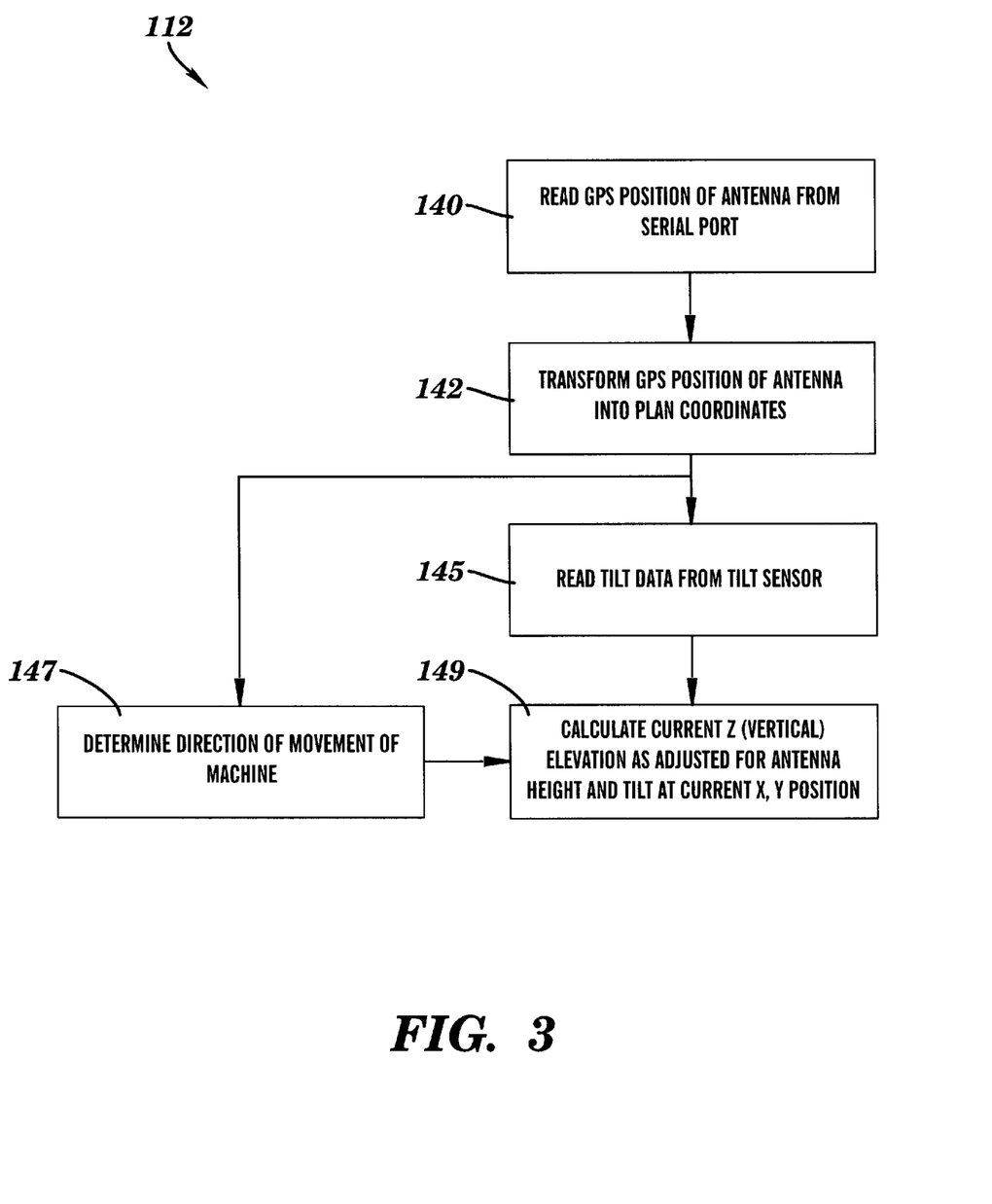
FIG. 3 is a flow chart representation of one embodiment of the surveying/earth moving system of the present invention incorporated into the system of FIG. 2.

Referring to FIGS. 2, 3 and 4, the method and apparatus constructed according to the principles of the present invention are shown. Briefly described, the present invention includes an apparatus and method, which method comprises the steps of:

1. Determining the three-dimensional (x, y, z coordinate) position of the receiving portion of a GPS antenna on an earth-moving machine or a vehicle;
2. Determining the tilt of the machine or vehicle in real time (tilt may vary from point to point); and
3. Utilizing the above data generated in steps 1 and 2 to calculate the three-dimensional (x, y, z coordinate) position of a point on the earth's surface disposed beneath the machine or vehicle.

Moreover, in a preferred embodiment, the present invention derives and displays the distance between the actual soil elevation of this point and the desired soil elevation.

The present invention will be described in greater detail hereinbelow. Many of the aspects of the present invention are also described in Applicants' "Gradestar™ Manual", version 1.42, dated Mar. 10, 1998, by Carlson Software, Inc., which is fully incorporated by reference herein.

Where used in this disclosure, the terms "computer" and/or "programmed processor" shall refer to any suitable processing device including, a programmable digital computer, microprocessor, microcontroller, etc., including dedicated, embedded and general purpose computers and workstations. As used herein, the phrase "surveying machinery," "mobile machinery," "vehicle" and various approximations thereof refer to self-propelled mobile machines such as trucks, cars, track-type tractors, road graders, pavers and asphalt layers which exhibit mobility over or through a worksite as a result of being provided with a prime mover (for example an engine) on a frame or body which drives ground-engaging wheels or tracks supporting the frame or body. The term "geography altering machinery" shall refer to such surveying or mobile machinery having the additional capacity to alter the geography of a worksite as a consequence of the provision on the frame or body of a tool or tool set such as a blade, shovel, bucket, ripper or the like. The term "GPS" as used herein shall refer to any navigational system, whether satellite-based or non-satellite-based, including the United States Global Positioning System known as GPS, the Russian Global Orbiting Navigator Satellite System (GLONASS) or other system capable of providing three-dimensional position data to a signal receiver.

Figure 1:
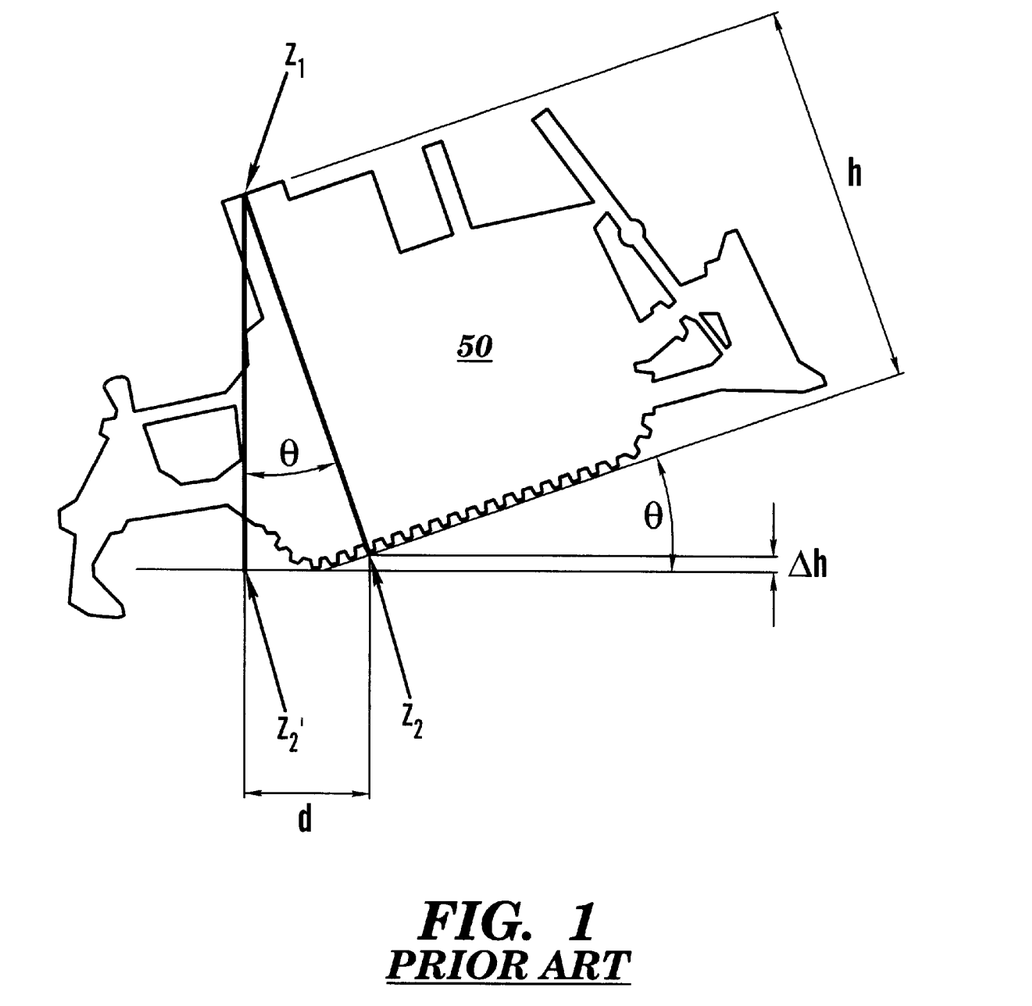
FIG. 1 is an elevational schematic view of conventional earth-moving machinery tilted to an angle e from horizontal.

Referring now to the Figs., the present invention will be more thoroughly described. As shown in prior art FIG. 1, a conventional earth moving or geography altering machine 50 may be equipped with a conventional GPS system having a signal receiving antenna portion at point $z_1$. These conventional systems generally adjust the height or z-coordinate of the received GPS data simply by subtracting the height h from the GPS coordinate data, to provide the height of a predetermined ground-engaging point $z_2$ of the machine (i.e. $z_2=z_1$–height h). Inaccuracies are thus introduced when the machine 50 is on a slope, as shown, so that the predetermined point $z_2$ is no longer directly beneath the signal receiving portion $z_1$ (i.e. the top) of the antenna. In this instance, the receiving portion $z_1$ may be disposed at a height h of 11–18 feet (3.3–5.5 m) or more from the ground engaging portion ($z_2$) of the track or wheel thereof. At a 20 degree slope, (i.e., $\theta=20°$) the horizontal position (x-y position) of the point vertically below the antenna ($z_2$) shifts a distance d of approximately 3.8 to 6.2 feet (1.1 to 1.9 m) or more and the actual height, or z position of point $z_2$ changes by a $\Delta h$ of 0.7 to 1.1 feet (0.2 to 0.3 m) or more. This shifting disadvantageously introduces error into the data provided by such systems. Such significant tilting of vehicles during surveying, earth-moving, and other vehicle operations, in which accurate, real-time, three-dimensional positioning would be desirable, is relatively common. For example, this includes surveying on a highly sloped topography, earth removal from a highly sloped topography to provide a level surface, and earth movement to restore a highly sloped, well-defined topography such as might occur in a mining remediation program.

The present invention overcomes the drawbacks associated with the prior art by compensating for any tilt of the vehicle relative to horizontal. Turning now to FIG. 2, a surveying/earth moving system 100 incorporating the present invention therein includes a GPS base receiver 102 for use with a GPS or similar three-dimensional positioning system. Base receiver 102 is disposed at a pre-determined, stationary location. The base receiver is disposed in communication with a mobile rover receiver 108, such as by radio transceivers 104 and 106. The rover receiver 108 is disposed on a vehicle such as geography-altering machine 50 (FIG. 1) and is adapted to receive GPS (position) signals from both the GPS satellite system and the GPS base receiver 102. The signals are utilized in a known manner, to determine the actual position as shown at block 110, of a signal-receiving portion of an antenna (located at $Z_1$ in FIG. 1) associated with GPS rover receiver 108. This arrangement of base receiver 102 and rover receiver 108 corrects for any offsets within the GPS signals transmitted, for example, by the orbiting GPS satellites. It should be recognized, however, that the present invention may be practiced without the use of a base receiver 102, i.e., by using only signals generated by the GPS satellites or other positioning systems, without departing from the spirit and scope of the present invention provided that the three-dimensional positioning accuracy without the use of a base receiver 102 is adequate.

The three dimensional-coordinate position calculated at 110 is then supplied to system module 112 which includes a programmed processor 114 and pitch and roll tilt sensors 116. Output generated by system module 112 is then communicated to an operator in any suitable manner, such as by display 118.

Thus, in a preferred embodiment, radio 106, rover receiver 108, system module 112 and display 118 are all disposed on an earth-moving and/or surveying machine or vehicle.

Turning now to FIG. 3, the method of the present invention for determining in real time the three-dimensional position of a point on the earth's surface is implemented by system module 112, as will now be described in greater detail. As the earth moving or surveying vehicle traverses the site, the three-dimensional position 110 (FIG. 2) is read at predetermined sampling intervals by processor 114, as shown at 140. The three-dimensional position provided by the GPS system is then converted into local (x, y, z) coordinates at block 142, using mathematical techniques commonly used by those skilled in the art. For example, the GPS coordinates are converted into local Cartesian coordinates which neglect the curvature of the Earth's surface and set the z-axis to correspond to the vertical direction and the x-y plane to correspond to the horizontal pLane. As shown at block 145, processor 114 subsequently reads tilt data provided by tilt sensor(s) 116 (FIG. 2). Tilt sensor step 145 utilizes one or more tilt sensors to provide an angle of tilt of the vehicle along at least one axis. This information is then utilized, in combination with the predetermined height h (FIG. 1) of the receiving portion of the antenna ($z_1$) above the ground engaging portion of the machinery, (i.e., point $z_2$ at the bottom of the wheels or the tracks in FIG. 1), to determine the actual position of a point of earth engaged by or located proximate to point $z_2$ of the machinery. In a preferred embodiment, point $z_2$ is disposed directly beneath point $z_1$ when the machinery is disposed in its level orientation. However, point $z_2$ may be laterally offset (i.e. offset in the horizontal plane) by a predetermined distance from point $z_1$ when the machinery is level. The position of $z_2$ is then calculated using the angle of tilt (FIG. 1), in combination with conventional trigonometric and vector mathematics. processor 114 thus adjusts the GPS position data for height (i.e., z-direction), as well as for the horizontal (x-y) position.

In operation, the processor 114 compensates for slope angle $\theta$ by comparing the unadjusted x-y position with a previous x-y position to determine the direction vector of the machinery at step 147. Although such point to point comparison may be preferred, the direction of the vehicle may be determined in any convenient manner, such as for example, by using a conventional compass or gyroscopic device(s). This direction vector is then utilized at step 149 to determine the actual orientation of the tilt sensor(s) to properly apply the tilt data generated thereby, along the x,y and z axes in a manner familiar to those skilled in the art of trigonometry and vector mathematics to determine the three-dimensional tilt-adjusted position of point $z_2$. The additional steps shown in FIGS. 4A and 4B that are not represented in FIG. 3 are optional steps. Depending on the three-dimensional positioning information desired, various combinations of these optional steps, as illustrated by one embodiment in FIGS. 4A and 4B, may be combined with the steps of FIG. 3.

Figure 4A:
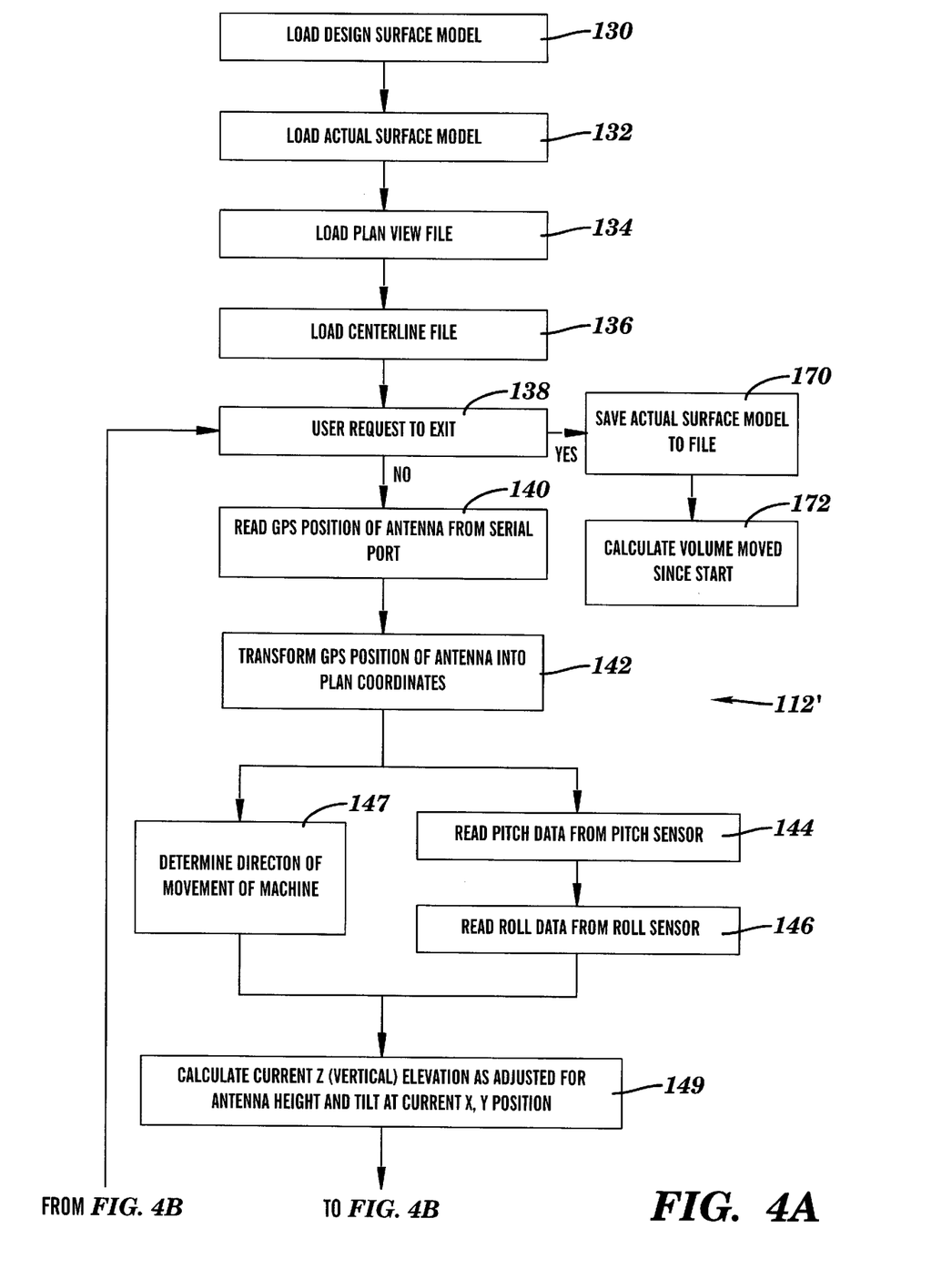
FIG. 4 is a flow chart representation of another embodiment of the present invention.
Figure 4B:
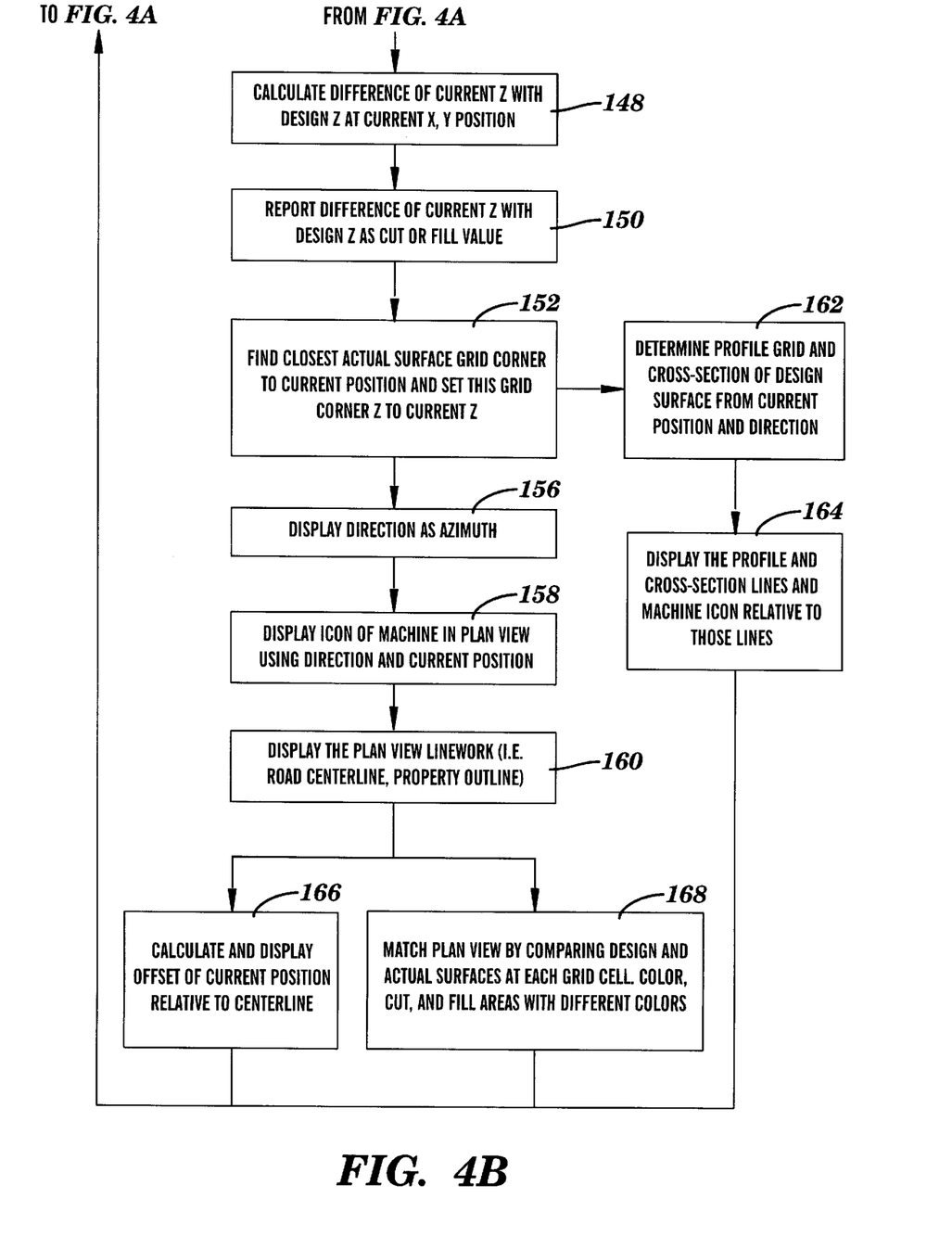

Turning now to FIGS. 4A and 4B, an alternate embodiment of the present invention is shown as system 112'. Referring to FIG. 4A, initially, a design surface model 130, including an array of coordinate points defining a desired site topography, may be loaded into the memory of programmed processor 114. As defined hereinabove, programmed processor 114 may include an embedded d device, or may be a general purpose programmable computer. For example, processor 114 may include a general purpose computer such as a PC having a Pentium® Process or manufactured by Intel® Corp.

A model of the actual surface of the site may also be loaded into processor 114 as shown at 132. This actual surface model may have been previously generated by conventional survey methodology, or, in the alternative, may be generated utilizing the present invention by simply traversing the site with the vehicle equipped with the present invention in the manner to be described in greater detail hereinbelow. Plan view and center line files are preferably loaded into memory associated with processor 114, as shown at 134 and 136, to facilitate real time viewing of the design and/or actual surface models 130 and 132 as the machinery traverses the site.

Once optional steps 130, 132, 134 and 136 have been completed, the earth moving or surveying machinery may begin to traverse the site. The steps as described hereinabove with respect to FIG. 3 are then implemented, with the exception that tilt sensor step 145 of FIG. 3 is shown as pitch and roll sensor steps 144 and 146, to utilize both pitch and roll data (i.e., tilt data along two orthogonal axes) in the steps 147 (determining direction of movement) and 149 (calculating current height).

Referring now to FIG. 4B, once the adjusted coordinates for the predetermined point $z_2$ are determined, this point data is compared to the design surface model 130 to calculate the difference in height (z dimension) between the actual and design surface at step 148. This z dimension value is then reported as a cut or fill value at step 150. The actual surface model 132 is then updated by locating the actual surface grid corner or point which is closest to the current position $z_2$ in terms of the x-y coordinates, and setting the z component of this grid corner to the current z position of point $z_2$ as shown at 152. As shown at step 156, the direction vector determined at step 147 may be optionally displayed as an azimuth. Step 158 includes the display of an icon of the machine in a plan view using the direction calculated in the step 147 and the current position as calculated in step 149. The line work, such as road center line, property outline, desired path of movement of the machine 50, etc., is also preferably displayed in the plan view of the site, as at 160. Processor 114 may determine profile and cross-sectional views of the design surface model centered at the current position and oriented along the current direction, such as shown at block 162. This view may include profile and cross-section lines and the machine icon relative to those lines as indicated in step 164. In another optional step, the station (distance along center line) and offset of the current position relative to the center line or desired path may also be displayed, such as in the plan view, as indicated at 166.

The actual surface model may then be compared to the design surface model and displayed in any convenient view. For example, a plan view may be hatched or color coded to indicate one color (i.e. red) where the actual model has a greater elevation than the design model to indicate that the area needs to "cut". Conversely, individual grid cells having an actual elevation below that indicated by the design surface model may be indicated with an alternate color (i.e., blue) to indicate that the area must be "filled". This step is indicated at block 168.

At this stage, the system loops back to block 138 to reiterate steps 140–168 to continue updating the actual surface model 132 as the vehicle continues to traverse the site. As also shown, block 138 generates a query to the user, to provide an opportunity for the user to stop or break the cycle of iterations, save the actual surface model to a file as at block 170, and/or calculate and display the volume of material moved by comparing the initial actual surface model with an ending actual surface model, as at 172.

Figure 5:
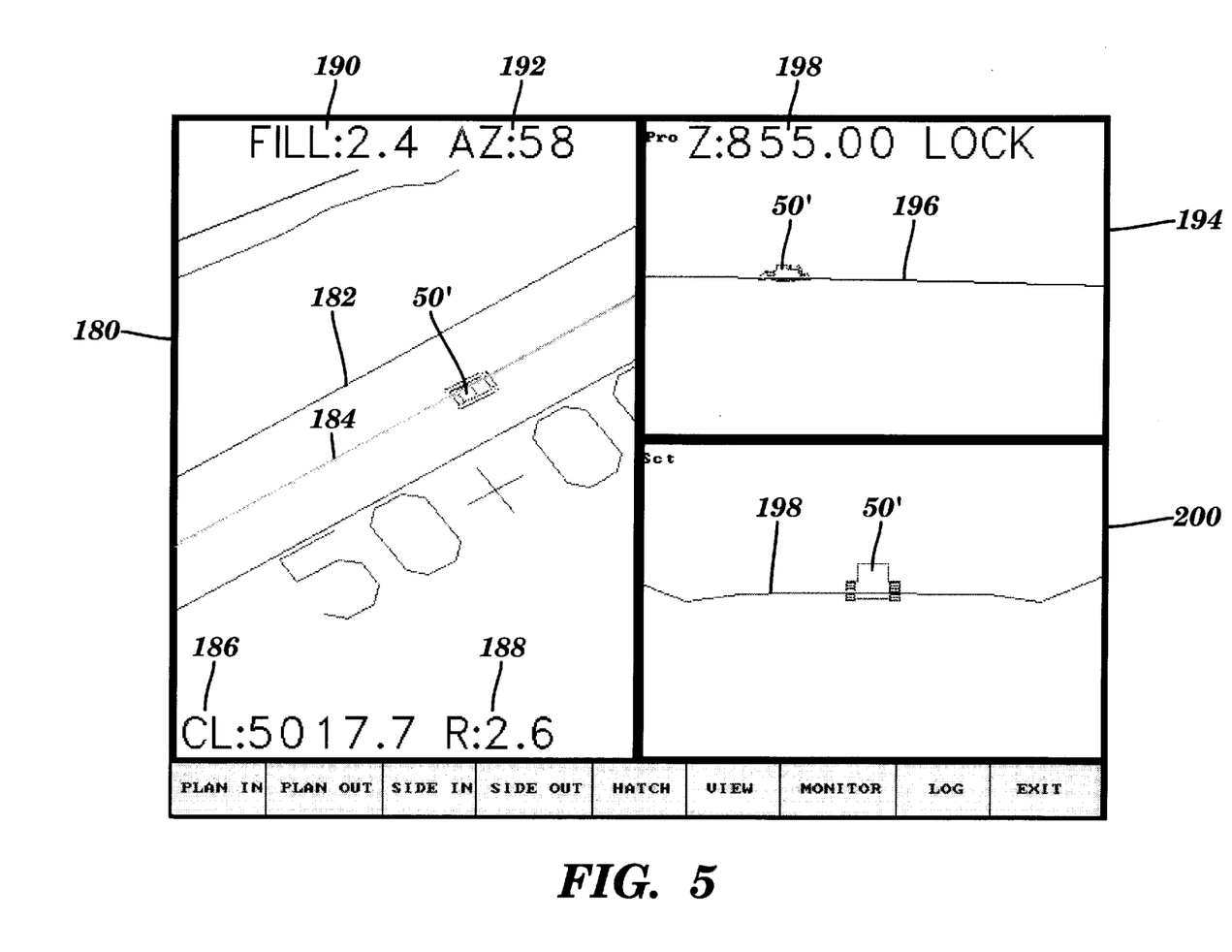
FIG. 5 is a screen display of one embodiment of multiple operator displays of the machinery position and control system provided by the embodiment of FIG. 4.

Turning now to FIG. 5, an example of a display generated by the present invention includes a simultaneous display of a top plan view 180 of the vehicle 50' equipped with the system 112' of the present invention indicating the position of the vehicle 50' relative to a road 182 and the road center line 184. This display thus indicates the station (location in the direction of the center line 184) and the offset to the center line 184 (i.e., the position relative to center line 184 in a direction orthogonal thereto). As also shown, alphanumeric indicia indicating the station from a predetermined point along center line 184 is shown at 186 and the offset is indicated alphanumerically at 188 with the prefix r or l indicating that the numerical offset is in the righthand or lefthand directions relative to the direction of travel of the vehicle 50'. The amount of cutting or filling required is shown alphanumerically at 190 while the azimuth of the center line 184 is shown alphanumerically at 192. A side elevational view of the actual position of the vehicle 50' including a profile of desired topographical elevation is shown at 194. As shown, the desired elevation 196 is taken along a vertical plane which includes the direction of movement of the vehicle 50'. As also shown, the current elevation (i.e., position along the z axis) of the vehicle 50' is shown alphanumerically at 198. A cross-sectional elevational view taken along a vertical plane extending transversely through vehicle 50' is shown at 200. In this view, vehicle 50' is shown at its actual location relative to the desired topography 198 as shown along the same transverse plane.

Figure 6:
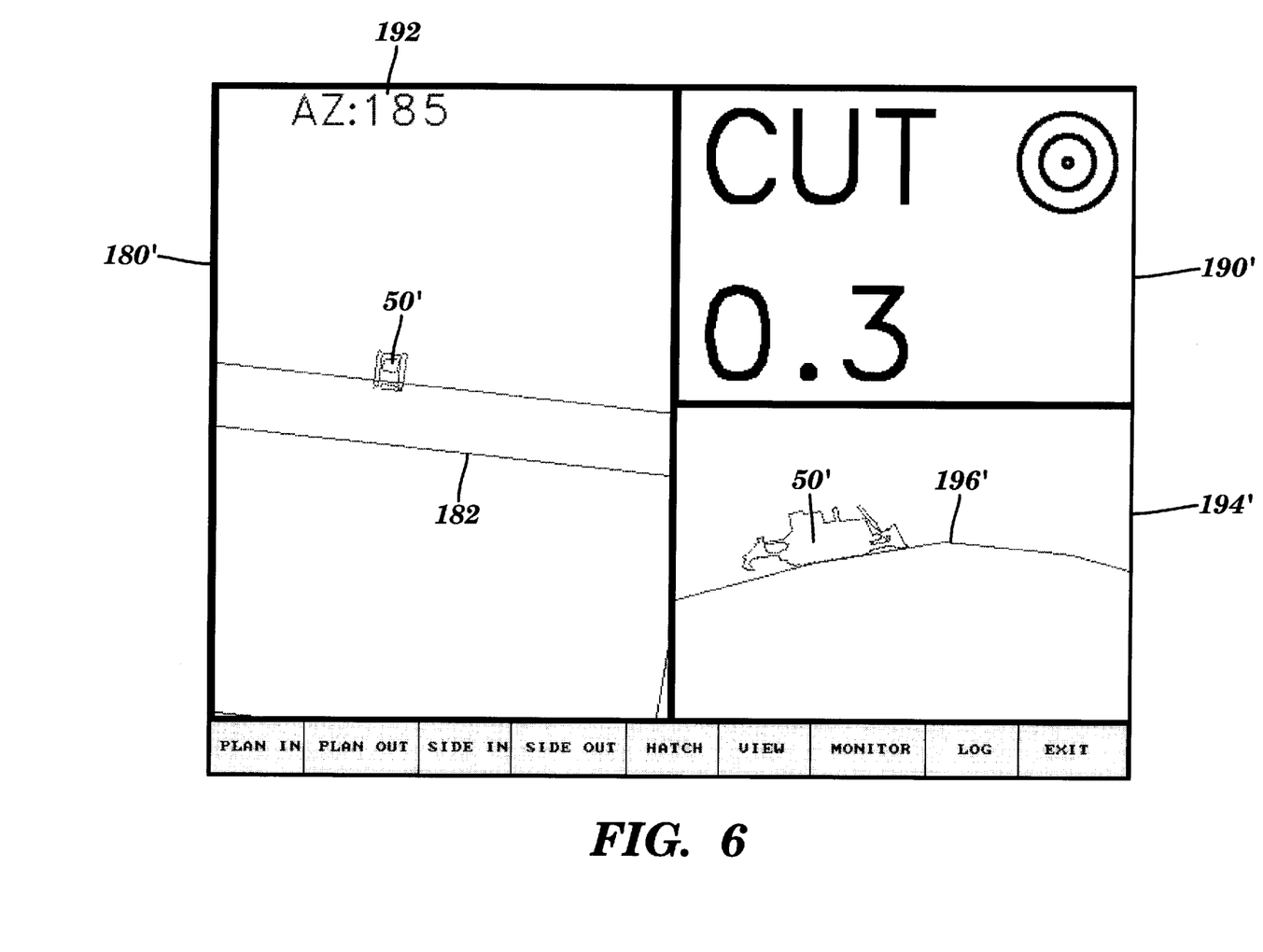
FIG. 6 is a screen display of another embodiment of multiple operator displays generated by the embodiment of the present invention shown in FIG. 4.

Turning now to FIG. 6, in another example of a screen display generated by system 112', a plan view of vehicle 50' is shown relative to a road 182 at 180'. Alphanumeric display of the azimuth 192 is also shown. An enlarged alphanumeric display of the amount to be cut is shown at 190', while the elevational view of the vehicle 50' is shown relative to a desired topography 196' as shown at 194'.

Figure 7:
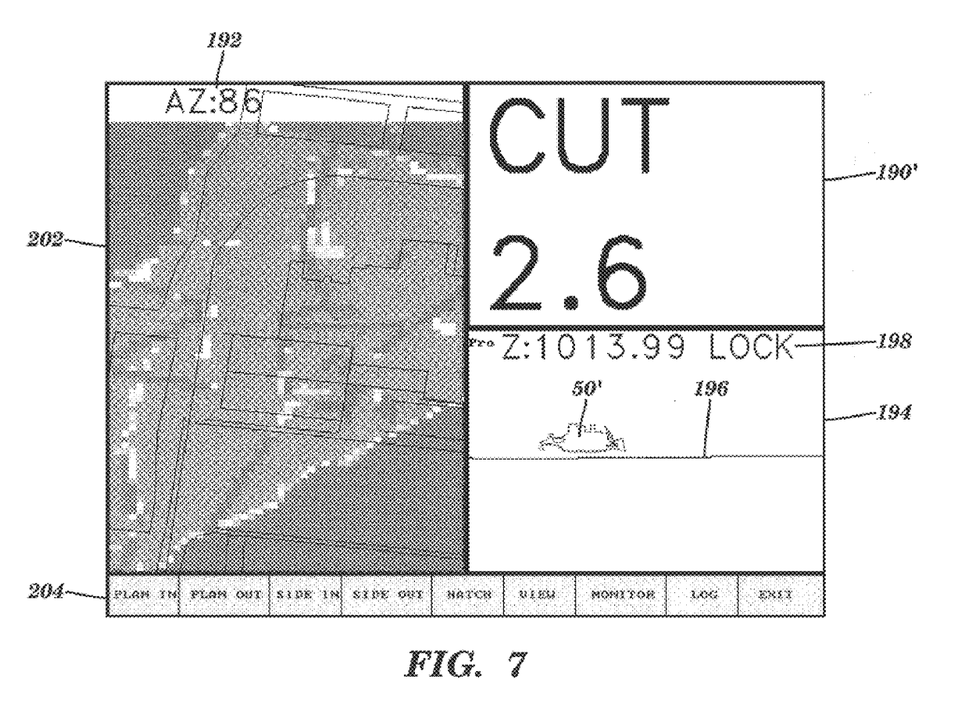
FIG. 7 is a screen display of a still further embodiment of an operator display generated by the embodiment of the present invention shown in FIG. 4.

As shown in FIG. 7, a further alternative display generated by system 112' of the present invention includes a plan view of a cut/fill map 202 of the actual topography shown in color or gray scale with different colors or shades corresponding to desired levels of cut or fill at a particular location. In this display, the azimuth of the direction of movement of vehicle 50' is shown alphanumerically at 192, while the cut/fill amount at the current location of vehicle 50' is shown at 190'. The actual elevation of vehicle 50' is shown alphanumerically at 198 and displayed graphically relative to the desired elevation 196 as at 194.

In addition, each of the displays shown in FIGS. 5–7 may be modified by various function keys or icons 204 which may be actuated by a user to effect various functions familiar to those skilled in the art of graphical user interfaces (GUI's) such as zooming in or out in plan and side views, providing cross-hatching, changing views, and viewing monitors and logs of prior activity of the vehicle 50'.

Thus, as shown and described hereinabove, the present invention provides cut or fill values in step 150 in a relatively efficient manner, by simply calculating the difference between two data points, i.e., between the three dimensional coordinate ($z_2$) generated at step 149 (FIGS. 3 and 4A), as adjusted for tilt at 145 (FIG. 3), i.e, pitch and roll as in steps 144 and 146 (FIG. 4A). This individual data point is then preferably compared to the single data point located at the closest x-y position of the design surface model at 130 (FIG. 4A). This point to point comparison advantageously eliminates complexity associated with prior art systems that interpolate between a plurality of points to calculate a path of the machinery, and then calculate the distance between this path and desired surface model.

The present invention achieves this relative simplicity by comparing the actual current coordinate point to the grid corner of the design surface model 130 which is closest to the x,y position of the actual coordinate. The combination of relatively small grid size (i.e., generated by the relatively high sampling rate of the GPS system), and the improved accuracy generated by the tilt or pitch and roll compensation of blocks 145 or 144 and 146, provide an overall system which provides an advantageous combination of high accuracy and low complexity relative to prior art systems. The simplicity of the present invention thus tends to reduce the number of calculations to enable faster real-time generation of cut and fill data, while advantageously reducing the computer hardware and software requirements of this system relative to prior art systems. Such reduced hardware and software requirements tend to reduce the overall cost of the system while also tending to facilitate incorporation of system module 112, 112' into a dedicated processor embedded within a particular vehicle.

Another advantage of the present invention is that any approximation to the nearest grid corner, as discussed hereinabove, occurs only at the design surface model 130 rather than at the actual surface model 132. This helps to ensure that the actual surface model 132 as updated by the iterations of system module 112 is comprised of the actual GPS coordinates, as corrected for pitch and roll, for improved accuracy. Thus, the actual surface model 132 as updated will remain nominally accurate.

Moreover, by calculating the coordinates at a predetermined point of a ground engaging portion of the machinery, such as the bottom of a wheel or track, (i.e, $z_2$ in FIG. 1) the present invention eliminates a source of complexity and potential malfunction associated with prior art systems which attempt to determine the position of a blade of the earth moving machinery and subsequently determine the distance between the blade and the earth therebeneath. Furthermore, the improved accuracy of the present invention provided by the combination of the aforementioned relatively high sampling rate and pitch and roll compensation enable the physical size of the machine and/or blade thereof to be omitted from the calculations performed by processor 114, for further simplicity.

Also, by utilizing two successive GPS point coordinates to determine the direction vector of the machinery, the present invention eliminates the need for a discrete direction sensor as disclosed in U.S. Pat. No. 5,512,905 to Nichols et al., for still further simplification.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A method for determining in real time the three-dimensional position of a point on an earth surface, comprising the steps of:
   (a) providing a vehicle adapted for ground engaging movement along the earth surface, said vehicle having:
       a GPS receiver system with a GPS signal-receiving antenna portion disposed thereon at a spaced location relative to a ground engaging point of the vehicle;
       one or more tilt sensors adapted to measure tilt of the vehicle relative to a horizontal plane along at least one axis; and
       a computer;
   (b) receiving a GPS signal at said GPS signal-receiving antenna portion;
   (c) utilizing the GPS signal to calculate the three-dimensional location of the signal-receiving antenna portion;
   (d) determining the direction of movement of the vehicle;
   (e) utilizing said one or more tilt sensors to provide an angle of tilt of the vehicle along at least one axis;
   (f) utilizing the three-dimensional location, the spaced location, the angle of tilt, and the direction of movement of the vehicle to calculate in real time the three-dimensional position of a point on the earth surface disposed at a predetermined location relative to the ground engaging point of the vehicle, as the vehicle traverses the surface.

2. The method of claim 1, wherein said utilizing step (c) further comprises the step of utilizing the computer to convert said GPS signal to local coordinates to calculate the three-dimensional location of the signal-receiving antenna portion.

3. The method of claim 2, wherein said local coordinates are Cartesian coordinates.

4. The method of claim 1, wherein the GPS signal provides position information in three dimensions.

5. The method of claim 1, wherein said providing step (a) further comprises providing one or more tilt sensors adapted to measure tilt of the vehicle relative to a horizontal plane along at least two mutually orthogonal axes, and said utilizing step (e) further comprises utilizing said one or more tilt sensors to provide first and second angles of tilt of the vehicle along the at least two mutually orthogonal axes.

6. The method of claim 5, wherein said first angle of tilt is disposed in a plane including the direction of said movement of the vehicle, and said second angle of tilt is disposed in a plane orthogonal to the direction of said movement.

7. The method of claim 1, wherein said determining step (d) further comprises utilizing direction-finding means selected from the group consisting of:
   calculation based on the three-dimensional positions of two or more of said three-dimensional locations of said signal-receiving antenna portion, said three-dimensional positions being determined by iterating said receiving step (b) and said utilizing step (c);
   gyroscopic measurements; and
   magnetic compass measurements.

8. The method of claim 1, wherein said computer has stored therein a three-dimensional reference line.

9. The method of claim 8, further comprising the step of:
   (g) calculating the difference between the three-dimensional position of the point in said utilizing step (f), and said reference line.

10. The method of claim 9, further comprising the steps of:
    (h) displaying the difference between the three-dimensional position of the point in said utilizing step (f) and said reference line, to an operator of said vehicle.

11. The method of claim 9, wherein said calculating step (g) further comprises calculating the difference in horizontal coordinates between the three-dimensional position of the point in said utilizing step (f), and the position in horizontal coordinates of said reference line.

12. The method of claim 11, further comprising the step of:
    (h) displaying the difference in horizontal coordinates between the three-dimensional position of the point in said utilizing step (f), and the position in horizontal coordinates of said reference line, to an operator of said vehicle.

13. The method of claim 1, wherein said computer further comprises a computer usable medium having embodied therein a desired topography of said earth surface.

14. The method of claim 13, further comprising the step of:
    (g) calculating the difference in the vertical direction between the three-dimensional position of said point in step (f) and the three-dimensional position of a point in said desired topography having horizontal coordinates closest to those of the point in step (f).

15. The method of claim 14, further comprising the step of displaying said difference in the vertical direction to an operator of said vehicle.

16. The method of claim 15, wherein the display of the difference in the vertical direction is selected from the group consisting of:
    a top plan view having cut and fill areas and the current position of said vehicle and optionally, site features of said desired topography;
    an elevational view of the actual position of said vehicle and of the desired elevation taken in the direction of movement;
    a transverse elevational view of the actual position of said vehicle and of the desired elevation taken along a plane orthogonal to said direction of movement; and numerical indicia representing said difference in the vertical direction.

17. The method of claim 15, wherein the display of the difference in the vertical direction is a simultaneous display of two or more displays selected from the group consisting of:
   a top plan view having cut and fill areas, the current position of said vehicle, and optionally, site features of said desired topography;
   an elevational view of the actual position of said vehicle and of the desired elevation in a plane which includes the direction of movement;
   a transverse elevational view of the actual position of said vehicle and of the desired elevation in a plane orthogonal to said direction of movement; and
   numerical indicia representing said difference in the vertical direction.

18. The method of claim 1, further comprising the step of:
   (g) utilizing said computer to store the three-dimensional position of said point on the earth surface.

19. The method of claim 18, wherein step (g) occurs in real time relative to said utilizing step (f).

20. The method of claim 1, wherein the vehicle comprises geography altering machinery.

21. The method of claim 1, wherein an initial topography of said earth surface representing the actual topography prior to a desired amount of earth-moving work by said vehicle is stored in said computing means.

22. An article of manufacture for determining in real time the three-dimensional position of a point on an earth surface, comprising:
   a computer usable medium having a computer readable program code embodied therein, said computer usable medium having:
      computer readable program code for reading a three-dimensional location of a GPS signal-receiving antenna portion disposed on a vehicle adapted for ground engaging movement along the earth surface, the GPS signal-receiving antenna portion disposed on the vehicle at a spaced location relative to a ground engaging point of the vehicle;
      computer readable program code for determining the direction of movement of the vehicle;
      computer readable program code for utilizing the three-dimensional location, the spaced location, an angle of tilt generated by one or more tilt sensors adapted to measure tilt of the vehicle relative to a horizontal orientation along at least one axis, and the direction of movement of the vehicle to calculate the three-dimensional position of a point on the earth surface disposed at a predetermined location relative to the ground engaging point of the vehicle, as the vehicle traverses the earth surface.

23. The article of manufacture of claim 22, wherein said computer usable medium further comprises computer readable program code for utilizing a GPS signal to calculate the three-dimensional location of a signal-receiving antenna portion in Cartesian coordinates.

24. The article of manufacture of claim 22, further comprising:
   one or more tilt sensors disposed to provide first and second angles of tilt of the vehicle along at least two mutually orthogonal axes.

25. The article of manufacture of claim 24, wherein said first angle of tilt is disposed in a plane including the direction of said movement of the vehicle, and said second angle of tilt is disposed in a plane orthogonal to the direction of said movement.

26. The article of manufacture of claim 22, wherein said computer usable medium further comprises computer readable program code for utilizing direction-finding means selected from the group consisting of:
   calculation based on the three-dimensional position of two or more of said three-dimensional locations of said signal-receiving antenna portion, said three-dimensional positions being determined by successive readings of said three-dimensional locations;
   gyroscopic measurements; and
   magnetic compass measurements.

27. The article of manufacture of claim 22, wherein said computer readable medium has stored therein a reference line.

28. The article of manufacture of claim 27, further comprising computer readable program code for calculating the difference between the three-dimensional position of the point at the earth surface and said reference line.

29. The article of manufacture of claim 28, further comprising computer readable program code for calculating the difference in horizontal coordinates between the three-dimensional position of the point of the earth surface and the position in horizontal coordinates of said reference line.

30. The article of manufacture of claim 28, further comprising computer readable program code for displaying the difference between the three-dimensional position of the point of the earth surface and said reference line, to an operator of said vehicle.

31. The article of manufacture of claim 22, wherein said computer usable medium further comprises a desired topography of said earth surface stored therein.

32. The article of manufacture of claim 22, wherein said computer usable medium further comprises an initial topography of said earth surface representing the actual topography prior to a desired amount of earth-moving work by said vehicle, stored therein.

33. An apparatus adapted for determining in real-time the three-dimensional position of a point on an earth surface, the apparatus comprising:
   a GPS receiver system with a GPS signal-receiving antenna portion disposable on a vehicle at a spaced location relative to a ground engaging point of the vehicle;
   one or more tilt sensors to measure tilt of the vehicle relative to a horizontal plane along at least one axis; and
   a computer adapted to:
      utilize the GPS signal received at said GPS signal-receiving antenna portion;
      to calculate the three-dimensional location of the signal-receiving antenna portion;
      determine the direction of movement of the vehicle;
      utilize said one or more tilt sensors to provide an angle of tilt of the vehicle along at least one axis; and
      utilize the three-dimensional location, the spaced location, the angle of tilt, and the direction of movement of the vehicle to calculate in real time the three-dimensional position of a point on the earth surface disposed at a predetermined location relative to the ground engaging point of the vehicle, as the vehicle traverses the surface.

* * * * *